(12) United States Patent
Ramachandra et al.

(10) Patent No.: US 10,645,626 B2
(45) Date of Patent: May 5, 2020

(54) HANDOVER METHOD AND NETWORK NODE

(71) Applicant: Telefonaktiebolaget LM Ericsson (publ), Stockholm (SE)

(72) Inventors: Pradeepa Ramachandra, Linköping (SE); Fredrik Gunnarsson, Linköping (SE); Andreas Bergström, Vikingstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/060,295

(22) PCT Filed: Dec. 21, 2015

(86) PCT No.: PCT/SE2015/051379
§ 371 (c)(1),
(2) Date: Jun. 7, 2018

(87) PCT Pub. No.: WO2017/111671
PCT Pub. Date: Jun. 29, 2017

(65) Prior Publication Data
US 2018/0368043 A1 Dec. 20, 2018

(51) Int. Cl.
*H04W 36/30* (2009.01)
*H04W 36/04* (2009.01)
(Continued)

(52) U.S. Cl.
CPC ....... *H04W 36/30* (2013.01); *H04W 36/0083* (2013.01); *H04W 36/04* (2013.01);
(Continued)

(58) Field of Classification Search
CPC .................................................. H04W 36/30
See application file for complete search history.

(56) References Cited

U.S. PATENT DOCUMENTS 9,560,552 B2 * 1/2017 Li ..................... H04W 36/0055
2014/0050197 A1 * 2/2014 Legg ..................... H04W 76/19
370/331
2014/0274055 A1 9/2014 Sriram et al.

FOREIGN PATENT DOCUMENTS

WO 2012 146276 A1 11/2012
WO 2014 035304 A1 3/2014

OTHER PUBLICATIONS

PCT International Search Report for International application No. PCT/SE2015/051379—dated Jul. 28, 2016.
(Continued)

*Primary Examiner* — Yemane Mesfin
*Assistant Examiner* — Henry Baron
(74) *Attorney, Agent, or Firm* — Sage Patent Group

(57) ABSTRACT

The present disclosure provides a handover (HO) method performed in a network node, comprising: receiving measurement reports from a UE, the measurement reports being related to a predetermined number of cells, the predetermined number of cells constituting a first set; determining based on the received measurement reports that there are at least two potential target cells in the first set for HO of the UE; and transmitting a HO request to each of the at least two potential target cells for the HO of the UE. The present disclosure further provides a network node using the HO method and a computer program product.

17 Claims, 7 Drawing Sheets

(51) Int. Cl.
*H04W 36/00* (2009.01)
*H04W 36/08* (2009.01)
*H04W 88/02* (2009.01)

(52) U.S. Cl.
CPC ........ *H04W 36/0016* (2013.01); *H04W 36/08* (2013.01); *H04W 88/02* (2013.01)

(56) References Cited

OTHER PUBLICATIONS

3GPP TSG RAN WG3 #75; Dresden, Germany; Title: Multiple HO preparation and MRO; Source: Samsung (R3-120225)—Feb. 6-10, 2012.
3GPP TS 36.331 v12.4.0; Technical Specification; 3rd Generation Partnership Project; Technical Specification Group Radio Access Network; Evolved Universal Terrestrial Radio Access (E-UTRA); Radio Resource Control (RRC); Protocol specification (Release 12)—Dec. 2014.
3GPP TS 36.331 v12.4.1; Technical Specification; 3rd Generation Partnership Project; Technical Specification Group Radio Access Network; Evolved Universal Terrestrial Radio Access (E-UTRA); Radio Resource Control (RRC); Protocol specification (Release 12)—Dec. 2014.

* cited by examiner

HANDOVER METHOD AND NETWORK NODE

PRIORITY

This nonprovisional application is a U.S. National Stage Filing under 35 U.S.C. § 371 of International Patent Application Serial No. PCT/SE2015/051379 filed Dec. 21, 2015, and entitled "HANDOVER METHOD AND NETWORK NODE."

TECHNICAL FIELD

The present disclosure generally relates to the technical field of telecommunication, and particularly to a handover method and a network node using the handover method.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In order to support mobility in a mobile network such as e.g. LTE (Long Term Evolution), a procedure referred to as HO (Handover) is employed whereby the mobile network can order the UE to connect to a different cell compared to the one to which it is currently connected. The reason for this is mainly mobility (as already mentioned) but could also be due to e.g. load balancing reasons.

To support the HO procedure, radio measurements are needed. A reporting criterion for these radio measurements are given by a set of HO parameters, which are defined in 3GPP standards with more details to be found in e.g. Sections 5.5.4 and 6.3.5 of 3GPP TS 36.331 "Radio Resource Control", version: V12.4.1 (2014-12). For example, the HO parameters which typically control where the HO occurs between the cells may comprise TTT (Time To Trigger), CIO (Cell Individual Offset), Frequency Specific Offset, Event specific offsets (e.g. A2, A3, A4, A5, B1, B2), HO hysteresis etc.

If the set of HO parameters are poorly adjusted in such a way that a UE (User Equipment) does not report handover measurements on time, the UE might lose its connection with an original cell before the HO is successfully completed and before the UE managed to establish a connection to a target cell. Such cases will result in a HOF (Handover Failure). Avoiding HOF is one of critical challenges in RRM (Radio Resource Management).

FIG. 1 which consists of FIG. 1(a) and FIG. 1(b) shows a conventional complete X2-based intra-MME (Mobility Management Entity)/intra S-GW (Serving Gateway) HO procedure for an example LTE system, as described in detail in Section 10.1.2.1.1 of 3GPP TS 36.300 version: V12.4.0 (2014-12).

As seen from FIG. 1(a), the HO procedure includes three phases: HO Preparation, HO Execution and HO Completion.

Hereinafter, only the HO Preparation phase including steps 0 to 7 which is related to our invention will be discussed below.

Step 0: UE context within a source eNB 101 contains information regarding roaming and access restrictions which were provided either at connection establishment or at the last TA (Time Advance) update.

Step 1: The Source eNB 101 configures UE measurement procedures according to the information regarding roaming and access restrictions. Measurements provided by the source eNB 101 may assist a function controlling connection mobility of the UE 103.

Step 2: A Measurement Report is triggered and sent from the UE 103 to the source eNB 101.

Step 3: The source eNB 101 makes a decision based on the Measurement Report and RRM information to hand off the UE 103.

Step 4: The source eNB 101 issues a Handover Request message to the target eNB 105 passing necessary information to prepare a HO at the target side (UE X2 signaling context reference at source eNB, UE S1 EPC (Evolved Packet Core) signaling context reference, target cell ID, $K_{eNB^*}$, RRC (Radio Resource Control) context including the C-RNTI of the UE in the source eNB, AS-configuration, E-RAB context and physical layer ID of the source cell+ short MAC-I for possible RLF recovery). UE X2/UE S1 signaling references enable the target eNB 105 to address the source eNB 101 and the EPC. The E-RAB context includes necessary RNL and TNL addressing information, and QoS profiles of the E-RABs.

Step 5: Admission Control may be performed by the target eNB 105 dependent on the received E-RAB QoS information to increase a likelihood of a successful HO, if the resources can be granted by target eNB 105. The target eNB 105 configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

Step 6: The target eNB 105 prepares HO with L1/L2 and sends a Handover Request Acknowledge message to the source eNB 101. The Handover Request Acknowledge message includes a transparent container to be sent to the UE 103 as an RRC message to perform the HO. The container includes a new C-RNTI, target eNB security algorithm identifiers for the selected security algorithms may include a dedicated RACH preamble, and possibly some other parameters i.e. access parameters, SIBs, etc. The HO Request Acknowledge message may also include RNL/TNL information for the forwarding tunnels, if necessary.

NOTE: As soon as the source eNB 101 receives the HO Request Acknowledge, or as soon as transmission of the HO command is initiated in the downlink, data forwarding may be initiated.

Step 7: The target eNB 105 generates a RRC message to perform the HO, i.e. RRCConnectionReconfiguration message including the mobilityControlInformation, to be sent by the source eNB 101 towards the UE 103. The source eNB 101 performs necessary integrity protection and ciphering of the message. The UE 103 receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB 101 to perform the HO. The UE 103 does not need to delay the HO execution for delivering the HARQ/ARQ responses to the source eNB 101.

Generally, HO between cells can be subject to different kinds of problems, and natures of the problems can be disclosed by analyzing some message flow after the handover has been initiated. For example, the HO problems may comprise:

Too early HO problem, in which HO from a source cell (i.e. a source eNB) to a target cell (i.e. a target eNB) was initiated too early, and the UE failed to establish a new connection with the target cell (steps 9, 10 or 11 fails in FIG. 1(a)); the UE re-establishes the connection with the source cell; and thereby, the source cell is capable of determining that the HOF was due to a too early HO.

Too late HO problem, in which HO from a source cell to a target cell was initiated too late and the connection to the UE fails before a new one to the target cell has been initiated; the UE will re-establish in the target cell including information about its source cell and optional additional failure information (time of failure, radio conditions, etc.), and the target cell will inform the source cell about the failure, which enables the source cell to determine the type of HOF.

HO ping-pong problem, in which the UE returns to the source cell shortly after being handed over to the target cell; thereby, the HO is seen as unnecessary.

HO to WC (wrong cell) problem, in which the UE is handed over to a target cell, but shortly after the HO, the connection fails, and the UE re-establishes in a third cell; and the third cell informs the target cell about the failure, and forwards the information to the source cell to enable determination of the cause of the failure.

In areas of a network where there is an overlap of more than two cells at a border, there is a risk that the UE is handed over to a WC (i.e., a non-intended cell), which could result in a HOF. Tuning the HO border based on this information could potentially affect the entire borders between the source cell and other neighboring cells.

FIG. 2 shows an exemplary scenario where a HO to WC problem occurs during movement of a UE.

In FIG. 2, the UE moving from CellA 201 via a path shown in a solid line could be handed over to CellC 205; but soon after the HO to CellC 205, the connection fails, and the CellC 205 should initiate another HO towards CellB 203. In this process, the HO to WC problem occurs. A similar HO to WC problem could occur on a path shown in a dotted line just by interchanging roles of the CellB 203 and the CellC 205 respectively.

The HO performance obtained by the conventional HO solution is reduced in a case that there is a risk that the HOF may occur due to the HO to WC problem e.g. when there is an overlap of more than two cells at the border which will be discussed in detail later.

Therefore, a HO solution capable of improving the HO performance in this case is desired.

SUMMARY

Accordingly, an object of the present disclosure is to provide a HO solution capable of improving the HO performance in the case that there is a risk that a HOF may occur due to a HO to WC problem.

In a first aspect of the present disclosure, a HO method is provided. The HO method comprises:
receiving measurement reports from a UE, the measurement reports being related to a predetermined number of cells, the predetermined number of cells constituting a first set;
determining based on the received measurement reports that there are at least two potential target cells in the first set for HO of the UE; and
transmitting a HO request message to each of the at least two potential target cells for the HO of the UE.

In an embodiment of the HO method, the HO method further comprises:
selecting, based on evaluation of the measurement reports received from the UE related to the at least two potential target cells, one of the at least two potential target cells to include information about the selected potential target cell in a HO command to be transmitted to the UE; and
transmitting the HO command to the UE for the HO of the UE.

In an embodiment of the HO method, the step of determining further comprises:
determining a cell in the first set to be the best potential target cell; and
determining at least one cell in the first set other than the best potential target cell to be a potential target cell, if a difference between a measurement related to the best potential target cell and a measurement related to the at least one cell is less than a predetermined threshold.

In an embodiment of the HO method, the at least two potential target cells belong to a second set which consists of cells having had a HO to wrong cell (WC) problem, the HO to WC problem being caused by a HO to a WC.

In an embodiment of the HO method, the HO method further comprises:
configuring the UE with information on the predetermined number, based on HO statistics related to a HO to WC problem with respect to HOs which were initiated by the network node in a predetermined period.

In an embodiment of the HO method, the HO method further comprises:
collecting HO statistics with respect to the HOs which were initiated by the network node in the predetermined period;
identifying, among the collected HO statistics, HO statistics related to a HO to WC problem; and
identifying information about a number and identities of the cells in the second set based on the identified HO statistics related to a HO to WC problem.

In an embodiment of the HO method, the step of configuring comprises:
configuring the UE with the information about the predetermined number, based on the number of the cells in the second set.

In an embodiment of the HO method, the predetermined number equals the number of cells in the second set, which is larger than 1.

In an embodiment of the HO method, wherein
the step of configuring comprises: configuring the UE to provide further measurement reports; and wherein
the step of receiving comprises: receiving the measurement reports related to the at least two potential target cells from the UE in a measurement collection period (T); and wherein
the step of selecting comprises: selecting the one of the at least two potential target cells based on evaluation of the measurement reports received in the measurement collection period (T) from the UE related to the at least two potential target cells.

In an embodiment of the HO method, the evaluation comprises at least one of:
evaluation of variation rates of measurements related to the at least two potential target cells; and
evaluation of difference between a mean measurement related to the best potential target cell and a mean measurement related to another of the at least two potential target cells.

In an embodiment of the HO method, the remaining of the at least two potential target cells are candidate cells for re-establishment of the UE in a case that the UE undergoes a handover failure (HOF).

In a second aspect of the present disclosure, a network node is provided. The network node comprises: a reception unit, configured to receive measurement reports from a UE, the measurement reports being related to a predetermined number of cells, the predetermined number of cells constituting a first set; a determination unit, configured to determine based on the received measurement reports that there are at least two potential target cells in the first set for HO of the UE; and a transmission unit, configured to transmit a HO request message to each of the at least two potential target cells for the HO of the UE.

In an embodiment of the network node, the network node further comprises:
a selection unit, configured to select, based on evaluation of the measurement reports received from the UE related to the at least two potential target cells, one of the at least two potential target cells to include information about the selected potential target cell in a HO command to be transmitted to the UE; and
wherein the transmission unit is further configured to transmit the HO command to the UE for the HO of the UE.

In an embodiment of the network node, the determination unit is further configured to: determine a cell in the first set to be the best potential target cell; and determine at least one cell in the first set other than the best potential target cell to be a potential target cell, if a difference between a measurement related to the best potential target cell and a measurement related to the at least one cell is less than a predetermined threshold.

In an embodiment of the network node, the at least two potential target cells belong to a second set which consists of cells having had a HO to wrong cell (WC) problem, the HO to WC problem being caused by a HO to a WC.

In an embodiment of the network node, the network node further comprises:
a configuration unit, configured to configure the UE with information on the predetermined number, based on HO statistics related to a HO to WC problem with respect to HOs which were initiated by the network node in a predetermined period.

In an embodiment of the network node, the network node further comprises:
a collection unit, configured to collect HO statistics with respect to the HOs which were initiated by the network node in the predetermined period;
an identification unit, configured to identify, among HO collected statistics, the HO statistics related to a HO to WC problem; and identify information about a number and identities of the cells in the second set based on the identified HO statistics related to a HO to WC problem.

In an embodiment of the network node, the configuration unit is further configured to configure the UE with the information about the predetermined number, based on the number of the cells in the second set.

In an embodiment of the network node, the predetermined number equals the number of cells in the second set, which is larger than 1.

In an embodiment of the network node, the configuration unit is further configured to, after the transmission unit transmits the HO request message to each of the at least two potential target cells, configure the UE to provide further measurement reports, and the reception unit is further configured to receive the measurement reports related to the at least two potential target cells from the UE in a measurement collection period (T); and wherein the selection unit is further configured to: select the one of the at least two potential target cells based on evaluation of the measurement reports received in the measurement collection period (T) from the UE related to the at least two potential target cells.

In an embodiment of the network node, the evaluation comprises at least one of:
evaluation of variation rates of measurements related to the at least two potential target cells; and
evaluation of difference between a mean measurement related to the best potential target cell and a mean measurement related to another of the at least two potential target cells.

In an embodiment of the network node, the remaining of the at least two potential target cells are candidate cells for re-establishment of the UE in a case that the UE undergoes a handover failure (HOF).

In a third aspect of the present disclosure, a network node is provided. The network node comprises:
a communication interface arranged for wireless communication,
a processor, and
a memory including instructions which, when executed by said processor, cause said network node to:
receive, via the communication interface, measurement reports from a UE, the measurement reports being related to a predetermined number of cells, the predetermined number of cells constituting a first set;
determine based on the received measurement reports that there are at least two potential target cells in the first set for HO of the UE; and
transmit, via the communication interface, a HO request message to each of the at least two potential target cells for the HO of the UE.

In an embodiment of the network node, the memory further includes instructions which, when executed by said processor, cause the network node to:
select, based on evaluation of the measurement reports received from the UE related to the at least two potential target cells, one of the at least two potential target cells to include information about the selected potential target cell in a HO command to be transmitted to the UE; and
transmit, via the communication interface, the HO command to the UE for the HO of the UE.

In an embodiment of the network node, the memory further includes instructions which, when executed by said processor, cause the network node to:
determine a cell in the first set to be the best potential target cell; and
determine at least one cell in the first set other than the best potential target cell to be a potential target cell, if a difference between a measurement related to the best potential target cell and a measurement related to the at least one cell is less than a predetermined threshold.

In an embodiment of the network node, the at least two potential target cells belong to a second set which consists of cells having had a HO to wrong cell (WC) problem, the HO to WC problem being caused by a HO to a WC.

In an embodiment of the network node, the memory further includes instructions which, when executed by said processor, cause the network node to:
configure the UE with information on the predetermined number, based on HO statistics related to a HO to WC problem with respect to HOs which were initiated by the network node in a predetermined period.

In an embodiment of the network node, the memory further includes instructions which, when executed by said processor, cause the network node to:
collect HO statistics with respect to the HOs which were initiated by the network node in the predetermined period;
identify, among the HO collected statistics, the HO statistics related to a HO to WC problem; and
identify information about a number and identities of the cells in the second set based on the identified HO statistics related to a HO to WC problem.

In an embodiment of the network node, the memory further includes instructions which, when executed by said processor, cause the network node to:
configure the UE with the information about the predetermined number, based on the number of the cells in the second set.

In an embodiment of the network node, the predetermined number equals the number of cells in the second set, which is larger than 1.

In an embodiment of the network node, the memory further includes instructions which, when executed by said processor, cause the network node to:
configure the UE to provide further measurement reports, after the HO request message is transmitted via the communication interface to each of the at least two potential target cells; and
receive the measurement reports related to the at least two potential target cells from the UE in a measurement collection period (T),
the process of selecting comprises: selecting the one of the at least two potential target cells based on evaluation of the measurement reports received in a measurement collection period from the UE related to the at least two potential target cells.

In an embodiment of the network node, the evaluation comprises at least one of:
evaluation of variation rates of measurements related to the at least two potential target cells; and
evaluation of difference between a mean measurement related to the best potential target cell and a mean measurement related to another of the at least two potential target cells.

In an embodiment of the network node, the remaining of the at least two potential target cells are candidate cells for re-establishment of the UE in a case that the UE undergoes a handover failure (HOF).

In a fourth aspect of the present disclosure, a computer program product is provided. The computer program product stores instructions that when executed, cause one or more computing devices to perform the method as described in the first aspect of the present disclosure.

The technical solutions of the present disclosure may at least have beneficial effects of:
not the entirety of the border between two cells needs to be changed when a HO to WC problem is observed between the said two cells;
tuning of the HO border between two cells could be separated in terms of regions of two-cell overlap and handled differently in order to achieve better HO border tuning between the cells;
no modification is required by the UE as no changes are introduced related to UE protocols and therefore this implementation could be done proprietarily using the existing standard to further enhance the HO performance;
in the case of unsuccessful HO of the UE, both the neighbor cells are prepared for a fast re-establishment of the UE, thereby reducing the time the UE is disconnected.

BRIEF DESCRIPTION OF THE DRAWINGS

The objects, advantages and characteristics of the present disclosure will be more apparent, according to descriptions of preferred embodiments in connection with the drawings, on which.

Figure 1A:
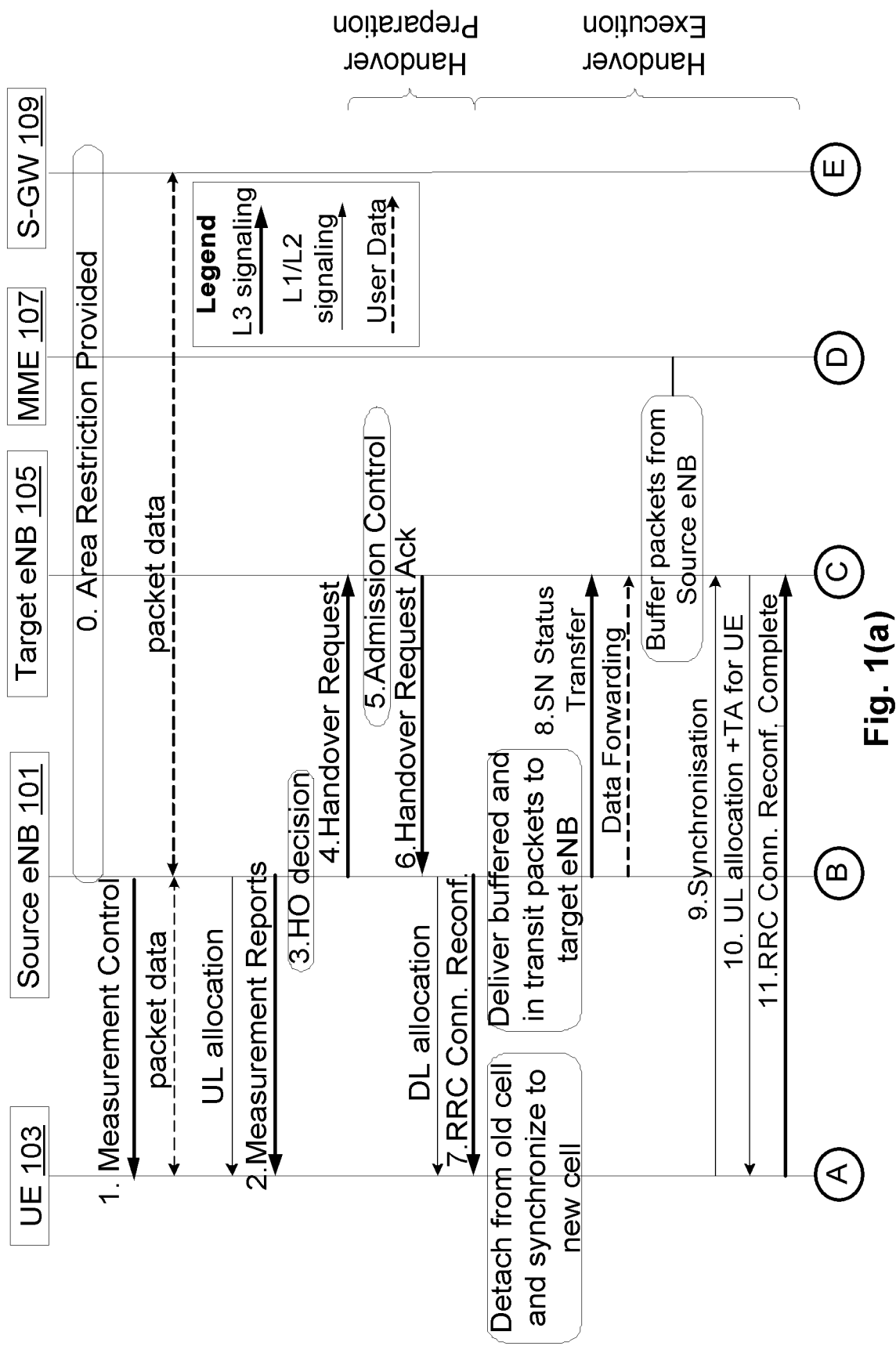
FIG. 1 which consists of FIGS. 1(a) and 1(b) illustratively shows a conventional complete X2-based intra-MME/intra S-GW HO procedure for an example LTE system.
Figure 1B:
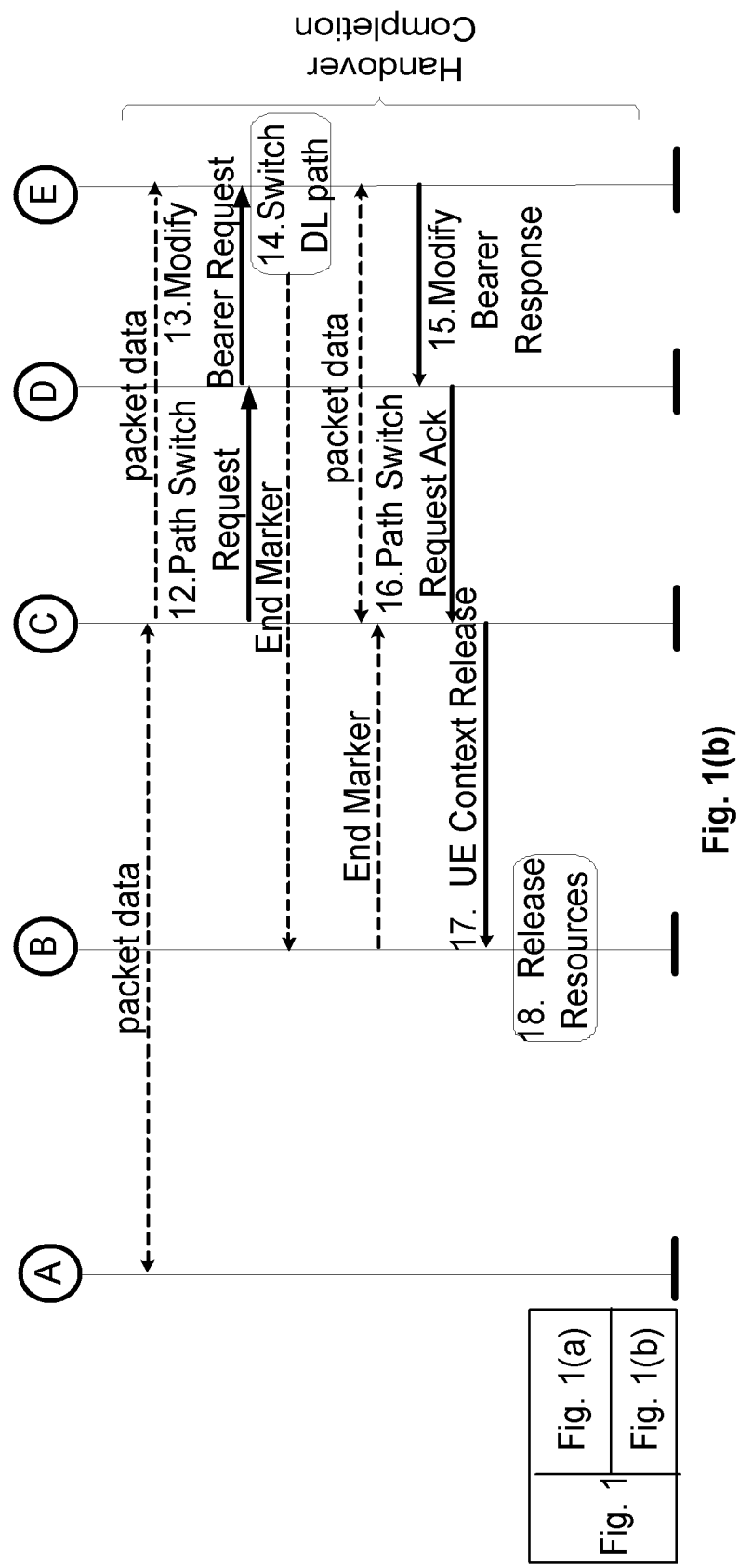

It should be noted that various parts in the drawings are not drawn to scale, but only for an illustrative purpose, and thus should not be understood as any limitations and constraints on the scope of the present disclosure.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The techniques described herein may be used for various wireless communication networks such as CDMA, TDMA, FDMA, OFDMA, SC-FDMA and other networks.

The terms "network" and "system" are often used interchangeably. The techniques described herein may be used for the wireless networks and radio technologies mentioned herein as well as other wireless networks and radio technologies proposed in the future. For clarity, certain aspects of the techniques are described below for LTE, and LTE terminology is used in much of the description below.

As previously described, in areas of a network where there is an overlap of more than two cells at a border, there is a risk that the UE is handed over to a WC (i.e., a non-intended cell), which could result in a HOF. Tuning the HO border based on this information could potentially affect the entire borders between the source cell and other neighboring cells.

Figure 2:
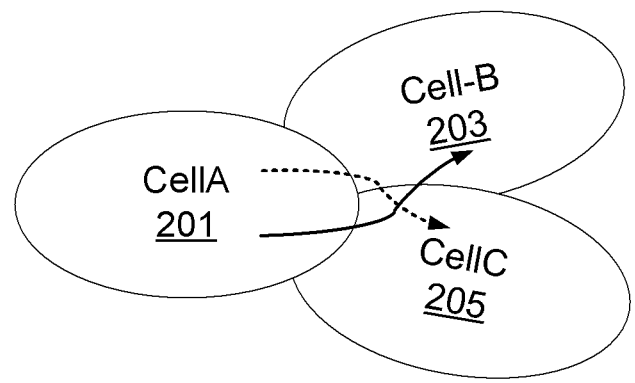
FIG. 2 illustratively shows an example scenario where a HO to WC problem occurs during movement of a UE.

In connection with the example as shown in FIG. 2, the UE moving from CellA 201 via a path shown in a solid line could be handed over to CellC 205; but soon after the HO to CellC 205, the connection fails, and the CellC 205 should initiate another HO towards CellB 203. In this process, the HO to WC problem occurs. A similar HO to WC problem could occur on a path shown in a dotted line just by interchanging roles of the CellB 203 and the CellC 205 respectively.

A MRO (Mobility Robustness Optimization) algorithm that tries to control the entire border region between two cells need to pay special attention in such a situation when having more than two cells overlapping with similar signal strengths along the border. In the above example as shown in FIG. 2, when the HO towards CellC 205 for the UE moving from CellA 201 to CellB 203 via CellC 205 (the path in the solid line) fails and if the UE re-establishes in CellB 203, the MRO algorithm does not know if it is due to a too late HO towards CellB 203 or due to too early HO towards CellC 205.

The existing HO solutions give either equal weightage, or some predefined fixed weightage, with respect to interpretation of HO to WC towards both these HO borders respectively. For example, if this weightage is equally set to 0.5, a HO to WC involving CellA 201 to CellB 203 (with re-establishment in CellC 205) is assumed to be a result of a too early HO from CellA 201 to CellB 203 with a probability of 0.5 and the other 0.5 probability is assigned towards the too late HO from CellA 201 to CellC 205.

Such a HO solution, however, does not solve the HOF problem caused by the HO to WC completely. This is because, if the HOF was actually caused by a wrong setting towards CellB 203, it should have been given a higher weightage than just 0.5 and if the HOF is not related to the HO border between CellA 201 and CellB 203 but a third cell involved in the HO, then there is no need to modify the HO border between CellA 201 and CellB 203 at all. Furthermore, it does not in an optimal way use all the information available at the moment when the measurement report is received, in deciding what type of HO needs to be carried out and also—if the HO fails—determining what is the prime reason behind the HOF.

As such, the HO performance obtained by the conventional HO solution is reduced in a case that there is a risk that the HOF may occur due to the HO to WC problem e.g. when there is an overlap of more than two cells at the border as previously discussed.

An object of the present disclosure is to provide a HO solution capable of improving the HO performance in the case that there is a risk that a HOF may occur due to a HO to WC problem.

The basic principle of the present disclosure consists in transmitting, by a source eNB, a HO request message to each of at least two potential target cells for the HO of the UE served by the source eNB, upon discovering presence of a HO to WC problem by the source eNB in a HO procedure, which is also called a HO request diversity scheme.

Hereinafter, a HO request diversity scheme in a HO method according to an embodiment of the present disclosure will be described with reference to FIG. 3.

Figure 3:
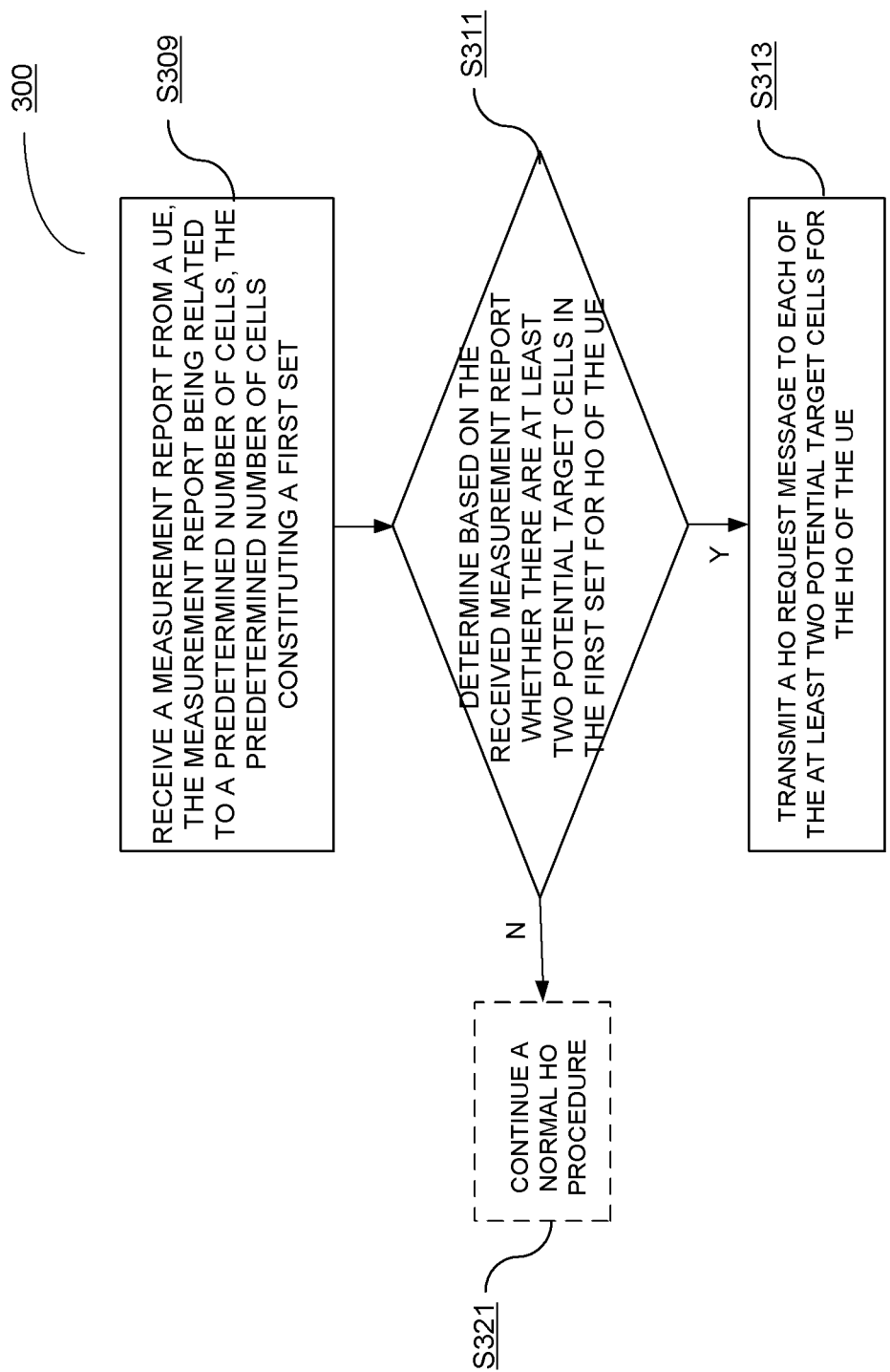
FIG. 3 illustratively shows a flowchart of a HO request diversity scheme in a HO method according to an embodiment of the present disclosure.

FIG. 3 illustratively shows a flowchart of a HO request diversity scheme in a HO method 300 according to an embodiment of the present disclosure. The Ho method 300 is performed at a network node (a source eNB, which will be described later in connection with FIGS. 6-8). The HO request diversity scheme involved in the HO method according to the embodiment of the present disclosure proposes improvement on Steps 2-4 related to the source eNB in the HO Preparation phase of the HO procedure as shown in FIG. 1(a).

As shown in FIG. 3, in step S309, the source eNB receives measurement reports from a UE served by the source eNB. The measurement reports relate to a predetermined number of neighbor cells, the predetermined number of neighbor cells constituting a first set, so that the source eNB may acquire knowledge about overlap of different neighbor cells at its border, which will be described in detail later.

In step S311, the source eNB determines, based on the received measurement reports relate to the cells in the first set, whether there are at least two potential target cells in the first set for HO of the UE. In particular, if it is determined that there are not at least two potential target cells ("N" in step S311), e.g., there is only one potential target cell, the method 300 proceeds to step S319 where a normal HO procedure is continued with e.g. Step 3 as shown in FIG. 1(a). Otherwise, if it is determined that there are at least two potential target cells ("Y" in step S311), the method 300 proceeds to step S313.

In step S313, the source eNB transmits a HO request message to each of the at least two potential target cells for the HO of the UE.

Hereinafter, a HO method according to an embodiment of the present disclosure including the HO request diversity scheme as described above will be described in detail with reference to FIG. 4.

Figure 4:
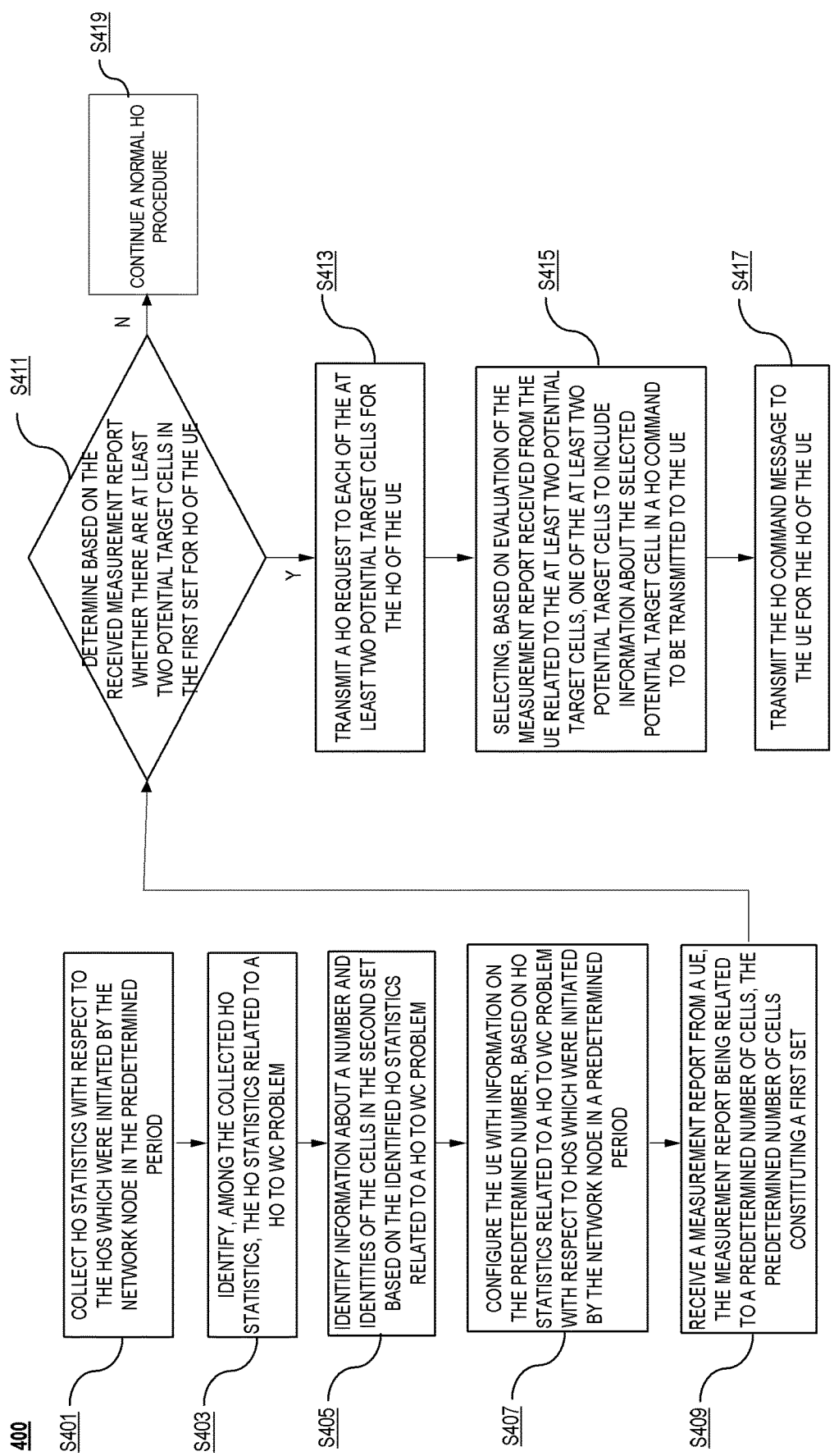
FIG. 4 illustratively shows a flowchart of a HO method according to an embodiment of the present disclosure.

FIG. 4 illustratively shows a flowchart of a HO method 400 according to an embodiment of the present disclosure. The Ho method 400 is performed at the source eNB. The HO method 400 according to the embodiment of the present disclosure proposes improvement on Steps 0-7 related to the source eNB in the HO Preparation phase of the HO procedure as shown in FIG. 1(a).

As shown in FIG. 4, in step S401, the source eNB collects HO statistics with respect to the HOs which were initiated by the source eNB in a predetermined period. The HO statistics may include details related to, but not limited to, too late HO, too early HO, ping-pong HO and HO to WC.

In step S403, the source eNB identifies, among the collected HO statistics, HO statistics related to a HO to WC problem, if any. As previously discussed, a HO to WC problem refers to such a case that the UE is handed over to a target cell, but shortly after the HO, the connection fails, and the UE re-establishes in a third cell; and the third cell informs the target cell about the failure, and forwards the information to the source eNB to enable determination of the cause of the failure. Then, the source eNB identifies cells having had a HO to WC problem from the HO statistics related to a HO to WC problem. Each of such HOs related to a HO to WC problem could involve different cells. For example, according to the collected HO statistics related to a HO to WC problem, one of the HOs could be from CellA to CellB but ending up in CellC, another HO could be from CellA to CellC but ending up in CellB, and another HO could be from CellA to CellD but ending up in CellB. Then, those identified cells (in this example, CellB, CellC, CellD) having had a HO to WC problem constitute a second set.

In step S405, the source eNB identifies information about a number N (in this example, 3) and identities (HO_to_WC_NeighbourSet) of those identified cells (in this example, CellB, CellC, CellD) in the second set, based on the identified HO statistics related to a HO to WC problem. In the scenario where the present disclosure is applied, N is an integer larger than 1.

Optionally, the number (N) and the identities (HO_to_WC_NeighbourSet) of those cells may be stored. In a case that statistics are regularly (or by requests) uploaded to an OAM (Operation Administration and Maintenance) system, and thereafter cleared in the source eNB, the source eNB needs to store information about N and HO_to_WC_Neighbour-Set, and update the stored information with information obtained from recent HOs. Alternatively, the information may be stored in detail, including time stamps for each failure event. The time stamps enable events older than a time limit to be deleted from the statistics.

In step S407, the source eNB configures the UE it serves with the information about the predetermined number, based on the HO statistics related to a HO to WC problem with respect to HOs which were initiated by the source eNB in the predetermined period. In the present embodiment, the source eNB configures the UE it serves with the information about the predetermined number, based on the number N of the identified cells in the second set. In particular, the source eNB may configure the UE it serves with a maxReportCells IE (Information Element) in a ReportConfigEUTRA RRC message set accordingly. In an embodiment, the IE maxReportCells is configured with the value N (in this example, 3) identified in step S405. With this configuration, the source eNB (in this example, CellA) will acquire more knowledge about overlap of different cells (in this example, CellB, CellC, CellD) at its border.

Following steps S409 to S411 are similar with steps S309 to S311 of the method 300 as shown in FIG. 3.

In step S409, the source eNB receives measurement reports from the UE it serves. The measurement reports relate to a predetermined number of neighbor cells, the predetermined number of neighbor cells constituting a first set. In a preferred embodiment, the predetermined number equals to the number of the cells in the second set, i.e., value N with which the IE maxReportCells is configured. In this example, the source eNB (CellA) receives measurement reports related to 3 neighbor cells from the UE. For example, the source eNB (CellA) may receive measurement reports related to 3 neighbor cells with top three strongest measurements. Assuming that RSRP of CellB=−102 dBm, RSRP of CellC=−103 dBm, RSRP of CellD=−107 dBm, and RSRP of CellE=−105 dBm, CellA may receive measurement reports related to CellB, CellC and CellE.

Of course, the predetermined number may not equal to the number of the cells in the second set, which is not particularly limited in the present disclosure.

In step S411, the source eNB determines, based on the received measurement reports related to e.g. three neighbor cells in the first set (CellB, CellC and CellE, in this example), whether there are at least two potential target cells in the first set for HO of the UE.

In an embodiment, the step S411 of determining may be performed only based on the received measurement reports. In this implementation, the step S411 of determining may comprise:

step S4111 (not shown) of determining a cell in the first set to be the best potential target cell, in which a cell in the first set with the strongest measurement, e.g., the strongest RSRP value, may be determined to be the best potential target cell (CellB, in this example); and step S4112 (not shown) of determining at least one cell in the first set other than the best potential target cell to be a potential target cell, if a difference between a measurement related to the best potential target cell and a measurement related to the at least one cell is less than a predetermined threshold.

In this example, assuming that the predetermined threshold for determining the potential target cells is 2 dB, since CellB having the RSRP value −102 dBm has been determined to be the best potential target cell, any other cells in the measurement reports within 'threshold=2 dB' may be determined as potential target cell(s) (in this example, CellC).

In another embodiment, the step S411 of determining may be performed based on the received measurement reports related to e.g. three neighbor cells in the first set (CellB, CellC and CellE, in this example) that have had a HO to WC problem in the past considering the collected HO statistics related to a HO to WC problem. In this implementation, the at least two potential target cells which are determined in steps S4111 and S4112 should further satisfy a condition that they belong to the second set (CellB and CellC, in this example). Further in an embodiment, the determined at least two potential target cells may have probabilities of having a HO to WC problem in the past larger than a predetermined threshold.

In a further embodiment, the step S411 of determining may be performed only based on the past HO statistics related to a HO to WC problem. In this implementation, the source eNB may determine the at least two potential target cells from the second set whose probabilities of having a HO to WC problem in the past larger than a predetermined threshold.

If it is determined that there are not at least two potential target cells ("N" in step S411), e.g., there is only one potential target cell, the method 400 proceeds to step S419 where a normal HO procedure is continued with e.g. Step 3 as shown in FIG. 1(a). Otherwise, if it is determined that there are at least two potential target cells ("Y" in step S411), the method 400 proceeds to step S413.

In step S413, the source eNB transmits a HO request message (including UE context) to each of the at least two potential target cells (CellB, CellC in this example) for the HO of the UE.

If the source eNB (CellA in this example) receives positive HO responses from all of the at least two potential target cells (CellB, CellC in this example), all of the at least two potential target cells are prepared with the UE context, and the method proceeds to step S415.

In step S415, the source eNB selects, based on evaluation of the measurement reports received from the UE related to the at least two potential target cells (CellB, CellC in this example), one of the at least two potential target cells to include information about the selected potential target cell in a HO command to be transmitted to the UE.

After one of the at least two potential target cells is selected to include information about the selected potential target cell in the HO command to be transmitted to the UE, the method 400 proceeds to step S417, in which the source eNB transmits the HO command including the information about the selected potential target cell to the UE for the HO of the UE.

The remaining of the at least two potential target cells may be candidate cells for re-establishment of the UE in a case that the UE undergoes a HOF. Since the candidate cells have been prepared with the UE context for a fast re-establishment of the UE, the time during which the UE is disconnected may be reduced.

In another embodiment, the source eNB may further configure the UE to provide measurement reports. From this point of time onwards, the source eNB waits for a period of time (T) to collect measurement reports from the UE related to the predetermined number of cells.

Figure 5:
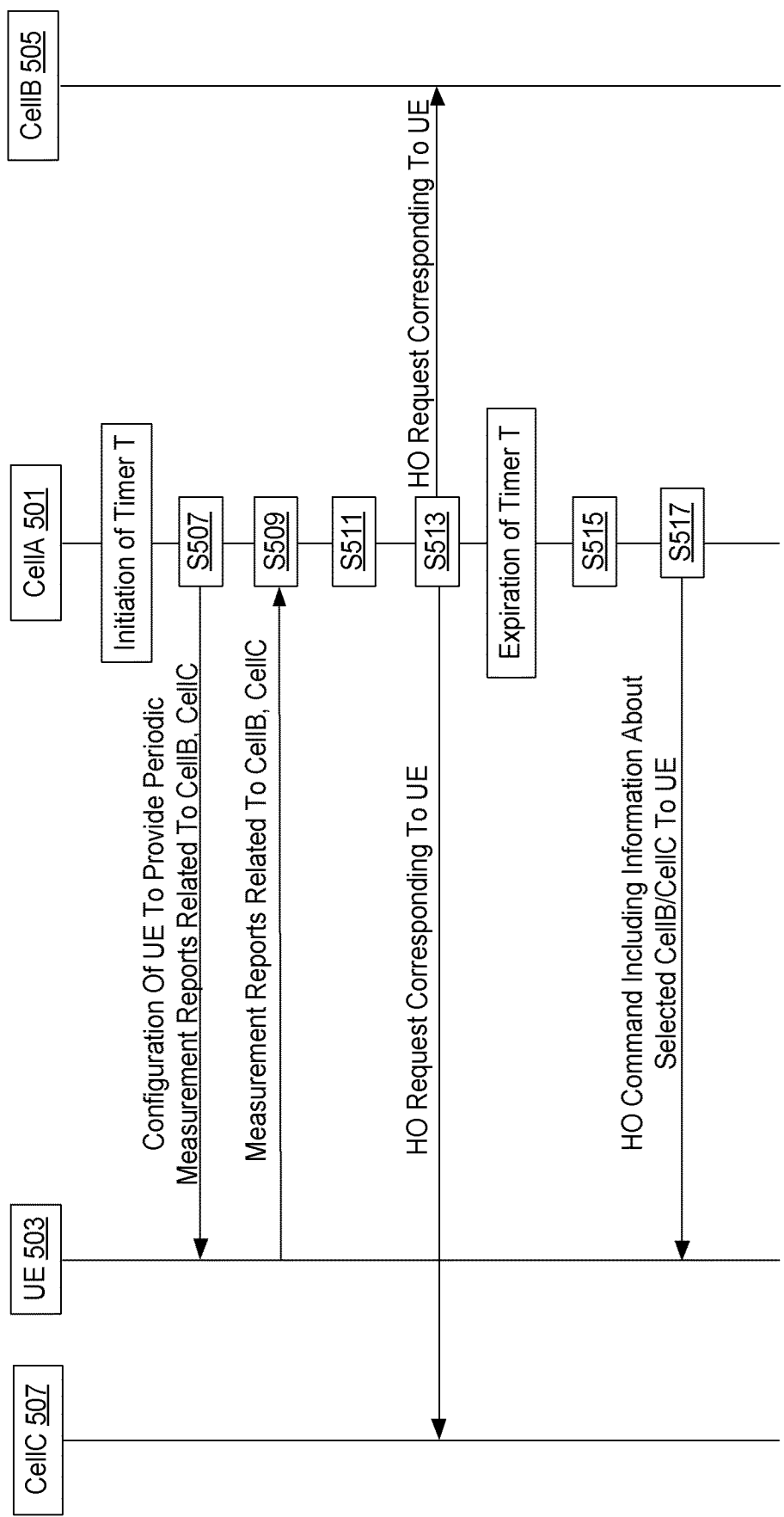
FIG. 5 illustratively shows an example signal flowchart of a HO method according to an alternative embodiment of the present disclosure.

Hereinafter, a HO method according to the other embodiment of the present disclosure will be described in detail with reference to FIG. 5. FIG. 5 illustratively shows an example signal flowchart of a HO method 500 according to this alternative embodiment of the present disclosure. Most of steps in the HO method 500 are identical or substantially identical with those steps in the HO method 400 as shown in FIG. 4 and thus use similar reference numbers. Accordingly, the descriptions of the steps identical or substantially identical with those in FIG. 4 are simplified, and may refer to description on corresponding steps in method 400 for details.

As shown in FIG. 5, in step S507, the source eNB ((in the example of FIG. 5, CellA 501) may further configure the UE 503 to provide further measurement reports, besides step S407 being performed. From this point of time onwards, a timer may be initiated for counting a measurement collection period T during which CellA 501 keeps collecting the measurement reports from the UE 503 related to the predetermined number of cells (in the example of FIG. 5, CellB 505 and CellC 507).

In step S509, CellA 501 receives measurement reports from the UE 503 related to the predetermined number of cells in the first set (CellB 505 and CellC 507).

In step S511, CellA 501 determines, based on the received measurement reports related to CellB 505 and CellC 507, whether there are at least two potential target cells in the first set for HO of the UE. If it is determined that there are at least two potential target cells ("Y" in step S511), the method 500 proceeds to step S513. The description on step S511 of determining may refer to step S411 for details. In the example of FIG. 5, assuming that the at least two potential target cells are also CellB 505 and CellC 507.

In step S513, CellA 501 transmits a HO request message (including UE context) to the at least two potential target cells (CellB 505 and CellC 507) respectively for the HO of the UE 503.

CellA 501 receives additional measurement reports from the UE 503 until the timer T expires. Then, in step S515, CellA 501 selects, based on evaluation of the measurement reports related to CellB 505 and CellC 507 received in the measurement collection period T from the UE, one of CellB 505 and CellC 507 to include information about the selected CellB/CellC in a HO command to be transmitted to the UE 503.

At the end of the measurement collection period T, evaluation of the measurement reports related to the at least two potential target cells (CellB 505 and CellC 507) may comprise at least one of:

evaluation of variation rates of measurements related to the at least two potential target cells (in the example of FIG. 5, e.g. a variation rate $R_B$ of RSRP values $RSRP_B$ of CellB and a variation rate $R_C$ of RSRP values $RSRP_C$ of CellC, where $$R_B = \frac{d}{dt}(RSRP_B), \text{ and } R_C = \frac{d}{dt}(RSRP_C);$$

and evaluation of difference Diff between a mean measurement related to the best potential target cell and a mean measurement related to another of the at least two potential target cells (in the example of FIG. 5, e.g. a mean RSRP value $\overline{RSRP_B}$ of CellB, a mean RSRP value $\overline{RSRP_C}$ of CellC, where Diff=$\overline{RSRP_B}$-$\overline{RSRP_C}$).

In the example of FIG. 5, e.g., if it is evaluated that $R_B > R_C + \alpha$, CellA may select in step S515 CellB to include information about CellB in a HO command to be transmitted to the UE; otherwise, e.g., if it is evaluated that $R_C > R_B + \beta$, CellA may select in step S515 CellC to include information about CellC in a HO command to be transmitted to the UE. Alternatively, e.g., if it is evaluated that Diff>$\Delta$, CellA may select in step S515 CellB to include information about CellB in a HO command to be transmitted to the UE; otherwise, CellA may select in step S515 CellC to include information about CellC in a HO command to be transmitted to the UE. Alternatively, e.g., if it is evaluated that $R_B \leq R_C + \alpha$ and $R_C \leq R_B + \beta$, and further if Diff>$\Delta$, CellA may select in step S515 CellB to include information about CellB in a HO command to be transmitted to the UE; otherwise further if Diff$\leq \Delta$, CellA may select in step S515 CellC to include information about CellC in a HO command to be transmitted to the UE. $\alpha$, $\beta$, $\Delta$ may be constants which can be selected as required in practice. As will be understood by the skilled in the art, other evaluation ways may be possible, which are not particularly limited in the present disclosure.

After one of the at least two potential target cells is selected to include information about the selected potential target cell in the HO command to be transmitted to the UE, the method 500 proceeds to step S517, in which CellA 501 transmits the HO command including the information about the selected potential target cell to the UE 503 for the HO of the UE 503.

Figure 6:
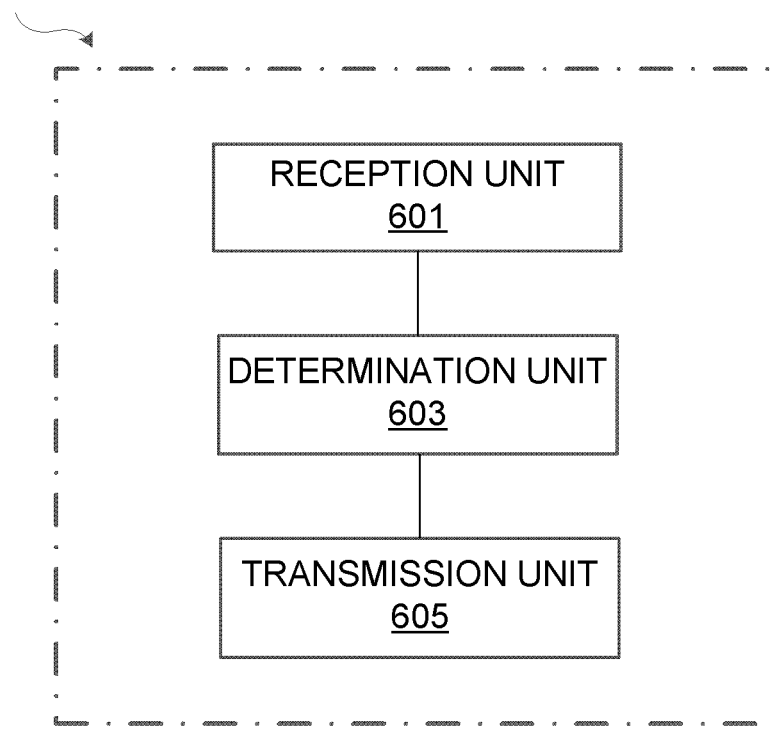
FIG. 6 illustratively shows a schematic structure diagram of a network node according to an embodiment of the present disclosure.

Hereinafter, a structure of a network node will be described with reference to FIG. 6. FIG. 6 illustratively shows a schematic structure diagram of a network node according to an embodiment of the present disclosure. The network node 600 in FIG. 6 refers to the source eNB as previously discussed, and may perform the method 300 described previously with reference to FIG. 3.

As shown in FIG. 6, the network node 600 comprises a reception unit 601, a determination unit 603 and a transmission unit 605.

In particular, the reception unit 601 is configured to receive, in step S309, measurement reports from a UE served by the network node 600, the measurement reports being related to a predetermined number of cells, the predetermined number of cells constituting a first set.

The determination unit 603 is configured to determine, in step S311, based on the received measurement reports whether there are at least two potential target cells in the first set for HO of the UE.

If the determination unit 603 determines that there are at least two potential target cells ("Y" in step S311), the transmission unit 605 is configured to transmit, in step S313, a HO request message to each of the at least two potential target cells for the HO of the UE.

Figure 7:
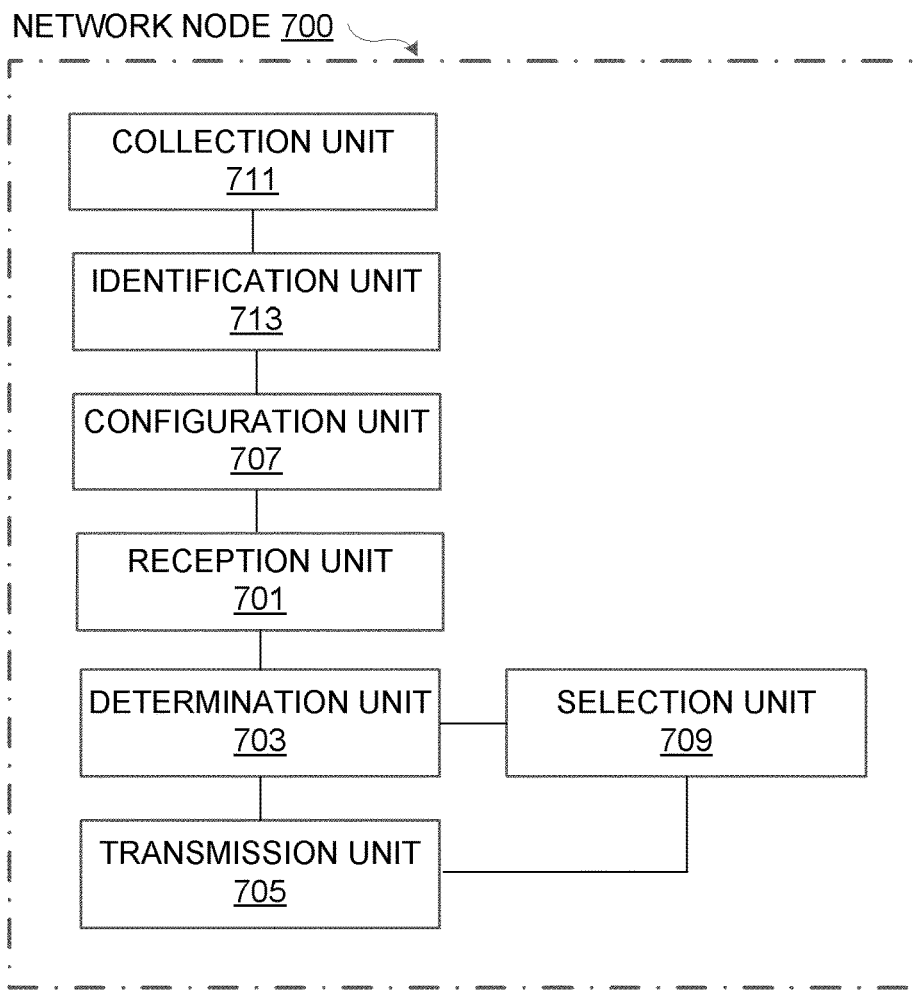
FIG. 7 illustratively shows a schematic structure diagram of a network node according to another embodiment of the present disclosure.

Hereinafter, a structure of a network node according to another embodiment of the present disclosure will be described with reference to FIG. 7. FIG. 7 illustratively shows a schematic structure diagram of a network node 700 according to another embodiment of the present disclosure. The network node 700 in FIG. 7 refers to the source eNB as previously discussed, and may perform the methods 400 and 500 described previously with reference to FIGS. 4 and 5 respectively.

As shown in FIG. 7, besides a reception unit 701, a determination unit 703 and a transmission unit 705 which are similar with those in the network node 600 of FIG. 6, the network node 700 further comprises: a configuration unit 707, a selection unit 709, a collection unit 711 and an identification unit 713.

In particular, the collection unit 711 is configured to collect, in step S401, HO statistics with respect to the HOs which were initiated by the network node in the predetermined period. The HO statistics may include details related to, but not limited to, too late HO, too early HO, ping-pong HO and HO to WC.

The identification unit 713 is configured to identify in step S403, among the collected HO collected statistics, HO statistics related to a HO to WC problem; and identify, in step S405, information about a number and identities of the cells in the second set based on the identified HO statistics related to a HO to WC problem.

The configuration unit 707 is configured to configure, in step S407, the UE served by the network node 700 with the information about the predetermined number, based on the HO statistics related to a HO to WC problem with respect to HOs which were initiated by the network node 700 in the predetermined period.

The reception unit 701 is configured to receive, in step S409, measurement reports from a UE served by the network node 700, the measurement reports being related to a predetermined number of cells, the predetermined number of cells constituting a first set.

The determination unit 703 is configured to determine, in step S411, based on the received measurement reports whether there are at least two potential target cells in the first set for HO of the UE.

In an embodiment, the determination unit 703 may determine, in step S4111, a cell in the first set to be the best potential target cell, in which a cell in the first set with the strongest measurement, e.g., the strongest RSRP value, may be determined to be the best potential target cell; and determine, in step S4112, at least one cell in the first set other than the best potential target cell to be a potential target cell, if a difference between measurement related to the best potential target cell and measurement related to the at least one cell is less than a predetermined threshold In another embodiment, the determination unit 703 may determine based on the received measurement reports related to the at least two potential target cells in the first set that have had a HO to WC problem in the past considering the collected HO statistics related to a HO to WC problem. In this implementation, the at least two potential target cells which are determined in steps S4111 and S4112 should further satisfy a condition that they belong to the second set. Further in an embodiment, the determined at least two potential target cells may have probabilities of having a HO to WC problem in the past larger than a predetermined threshold.

In a further embodiment, the determination unit 703 may determine only based on the past HO statistics related to a HO to WC problem. In this implementation, the determination unit 703 may determine the at least two potential target cells from the second set whose probabilities of having a HO to WC problem in the past larger than a predetermined threshold.

If the determination unit 703 determines that there are at least two potential target cells ("Y" in step S411), the transmission unit 705 is configured to transmit, in step S413, a HO request message to each of the at least two potential target cells for the HO of the UE.

The selection unit 709 is configured to select, based on evaluation of the measurement reports received from the UE related to the at least two potential target cells, one of the at least two potential target cells to include information about the selected potential target cell in a HO command to be transmitted to the UE.

The transmission unit 705 is further configured to transmit, in step S417, the HO command to the UE for the HO of the UE.

The remaining of the at least two potential target cells may be candidate cells for re-establishment of the UE in a case that the UE undergoes a HOF. Since the candidate cells have been prepared with the UE context for a fast re-establishment of the UE, the time during which the UE is disconnected may be reduced.

In another embodiment, the configuration unit 707 may further configure the UE to provide further measurement reports. From this point of time onwards, the network node 700 waits for a period of time (T) to collect measurement reports from the UE related to the predetermined number of cells.

In this implementation, the reception unit 701 may be further configured to receive, in step S509, the measurement reports related to the at least two potential target cells from the UE in a measurement collection period (T); and the selection unit 709 may further be configured to select, in step S515, the one of the at least two potential target cells based on evaluation of the measurement reports received in the measurement collection period (T) from the UE related to the at least two potential target cells.

Figure 8:
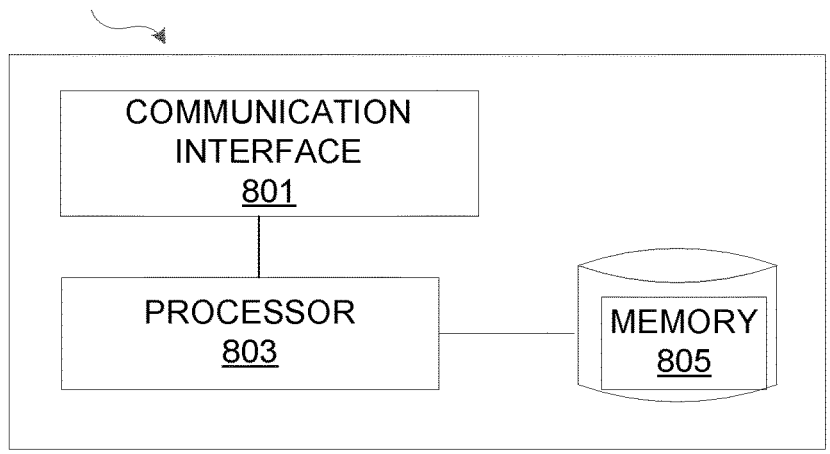
FIG. 8 illustratively shows a schematic structure diagram of a network node according to yet another embodiment of the present disclosure.

Hereinafter, a structure of a network node according to yet another embodiment of the present disclosure will be described with reference to FIG. 8. FIG. 8 illustratively shows a schematic structure diagram of a network node according to yet another embodiment of the present disclosure.

As shown in FIG. 8, the network node 800 comprises a controller or a processor 803 comprising e.g., any suitable Central Processing Unit, CPU, microcontroller, Digital Signal Processor, DSP, etc., capable of executing computer program code. The computer program code may be stored in a memory 805. The memory 805 may be any combination of a RAM (Read And Write Memory) and a ROM (Read Only Memory). The memory may also comprise persistent storage, which, for example, can be any single one or combination of magnetic memory, optical memory, or solid state memory or even remotely mounted memory. The example network node 800 further comprises a communication interface 801 arranged for wireless communication with other devices or nodes, such as a UE served by the eNB.

The computer program code, when loaded from the memory 805 and run in the processor 803, causes network node 800 to perform the methods according to the disclosure, such as methods 300, 400 and 500. In an embodiment, the computer program code, when executed, cause network node 800 to receive, via the communication interface 801, measurement reports from a UE, the measurement reports being related to a predetermined number of cells, the predetermined number of cells constituting a first set; determine based on the received measurement reports that there are at least two potential target cells in the first set for HO of the UE; and transmit, via the communication interface 801, a HO request message to each of the at least two potential target cells for the HO of the UE.

According to foregoing embodiments of the disclosure, the disclosure has at least the following advantages:

- not the entirety of the border between two cells needs to be changed when a HO to WC problem is observed between the said two cells;
- tuning of the HO border between two cells could be separated in terms of regions of two-cell overlap and handled differently in order to achieve better HO border tuning between the cells;
- no modification is required by the UE as no changes are introduced related to UE protocols and therefore this implementation could be done proprietarily using the existing standard to further enhance the HO performance;

in the case of unsuccessful HO of the UE, both the neighbor cells are prepared for a fast re-establishment of the UE, thereby reducing the time the UE is disconnected.

The foregoing description of implementations provides illustration and description, but is not intended to be exhaustive or to limit the disclosure to the precise form disclosed. Modifications and variations are possible in light of the above teachings, or may be acquired from practice of the disclosure.

Aspects of the disclosure may also be implemented in methods and/or computer program products. Accordingly, the disclosure may be embodied in hardware and/or in hardware/software (including firmware, resident software, microcode, etc.). Furthermore, the disclosure may take the form of a computer program product on a computer-usable or computer-readable storage medium having computer-usable or computer-readable program code embodied in the medium for use by or in connection with an instruction execution system. The actual software code or specialized control hardware used to implement embodiments described herein is not limiting of the disclosure. Thus, the operation and behavior of the aspects were described without reference to the specific software code—it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A handover (HO) method performed in a network node, comprising:
    receiving measurement reports from a UE, the measurement reports being related to a predetermined number of cells, the predetermined number of cells constituting a first set;
    determining based on the received measurement reports that there are at least two potential target cells in the first set for HO of the UE;
    transmitting a HO request message to each of the at least two potential target cells for the HO of the UE;
    selecting, based on evaluation of the measurement reports received from the UE related to the at least two potential target cells, one of the at least two potential target cells to include information about the selected potential target cell in a HO command to be transmitted to the UE; wherein the evaluation comprises at least one of:
        evaluation of variation rates of measurements related to the at least two potential target cells;
        evaluation of difference between a mean measurement related to the best potential target cell and a mean measurement related to another of the at least two potential target cells; and
    transmitting the HO command to the UE for the HO of the UE.

2. The HO method according to claim 1, wherein the step of determining further comprises:
    determining a cell in the first set to be the best potential target cell; and
    determining at least one cell in the first set other than the best potential target cell to be a potential target cell, if a difference between a measurement related to the best potential target cell and a measurement related to the at least one cell is less than a predetermined threshold.

3. The HO method according to claim 1, wherein the at least two potential target cells belong to a second set which consists of cells having had a HO to wrong cell (WC) problem, the HO to WC problem being caused by a HO to a WC.

4. The HO method according to claim 1, further comprising:
    configuring the UE with information on the predetermined number of cells, based on HO statistics related to a HO to WC problem with respect to HOs which were initiated by the network node in a predetermined period.

5. The HO method according to claim 4, further comprising:
    collecting HO statistics with respect to the HOs which were initiated by the network node in the predetermined period;
    identifying, among the collected HO statistics, HO statistics related to a HO to WC problem; and
    identifying information about a number and identities of the cells in the second set based on the identified HO statistics related to a HO to WC problem.

6. The HO method according to claim 4, wherein the step of configuring comprises: configuring the UE with the information about the predetermined number of cells, based on the number of the cells in the second set.

7. The HO method according to claim 3, wherein the predetermined number of cells equals to the number of cells in the second set, which is larger than 1.

8. The HO method according to claim 4, wherein the step of configuring comprises: configuring the UE to provide further measurement reports; and wherein
    the step of receiving comprises: receiving the measurement reports related to the at least two potential target cells from the UE in a measurement collection period (T); and wherein
    the step of selecting comprises: selecting the one of the at least two potential target cells based on evaluation of the measurement reports received in the measurement collection period (T) from the UE related to the at least two potential target cells.

9. The HO method according to claim 1, wherein the remaining of the at least two potential target cells are candidate cells for re-establishment of the UE in a case that the UE undergoes a handover failure (HOF).

10. A network node, comprising:
a communication interface arranged for wireless communication,
a processor, and
a memory including instructions which, when executed by said processor, cause said network node to:
receive, via the communication interface, measurement reports from a UE, the measurement reports being related to a predetermined number of cells, the predetermined number of cells constituting a first set;
determine based on the received measurement reports that there are at least two potential target cells in the first set for HO of the UE;
transmit, via the communication interface, a HO request message to each of the at least two potential target cells for the HO of the UE;
select, based on evaluation of the measurement reports received from the UE related to the at least two potential target cells, one of the at least two potential target cells to include information about the selected potential target cell in a HO command to be transmitted to the UE; wherein the evaluation comprises at least one of:
evaluation of variation rates of measurements related to the at least two potential target cells;
evaluation of difference between a mean measurement related to the best potential target cell and a mean measurement related to another of the at least two potential target cells; and
transmit the HO command to the UE for the HO of the UE.

11. The network node according to claim 10, wherein the memory further includes instructions which, when executed by said processor, cause the network node to:
select, based on evaluation of the measurement reports received from the UE related to the at least two potential target cells, one of the at least two potential target cells to include information about the selected potential target cell in a HO command to be transmitted to the UE; and
transmit, via the communication interface, the HO command to the UE for the HO of the UE.

12. The network node according to claim 10, wherein the memory further includes instructions which, when executed by said processor, cause the network node to:
determine a cell in the first set to be the best potential target cell; and
determine at least one cell in the first set other than the best potential target cell to be a potential target cell, if a difference between a measurement related to the best potential target cell and a measurement related to the at least one cell is less than a predetermined threshold.

13. The network node according to claim 10, wherein the at least two potential target cells belong to a second set which consists of cells having had a HO to wrong cell (WC) problem, the HO to WC problem being caused by a HO to a WC.

14. The network node according to claim 10, wherein the memory further includes instructions which, when executed by said processor, cause the network node to:
configure the UE with information on the predetermined number of cells, based on HO statistics related to a HO to WC problem with respect to HOs which were initiated by the network node in a predetermined period.

15. The network node according to claim 14, wherein the memory further includes instructions which, when executed by said processor, cause the network node to:
collect HO statistics with respect to the HOs which were initiated by the network node in the predetermined period;
identify, among the HO collected statistics, the HO statistics related to a HO to WC problem; and
identify information about a number and identities of the cells in the second set based on the identified HO statistics related to a HO to WC problem.

16. The network node according to claim 14, wherein the memory further includes instructions which, when executed by said processor, cause the network node to:
configure the UE with the information about the predetermined number of cells, based on the number of the cells in the second set.

17. The network node according to claim 13, wherein the predetermined number equals to the number of cells in the second set, which is larger than 1.

* * * * *